Patented Mar. 31, 1942

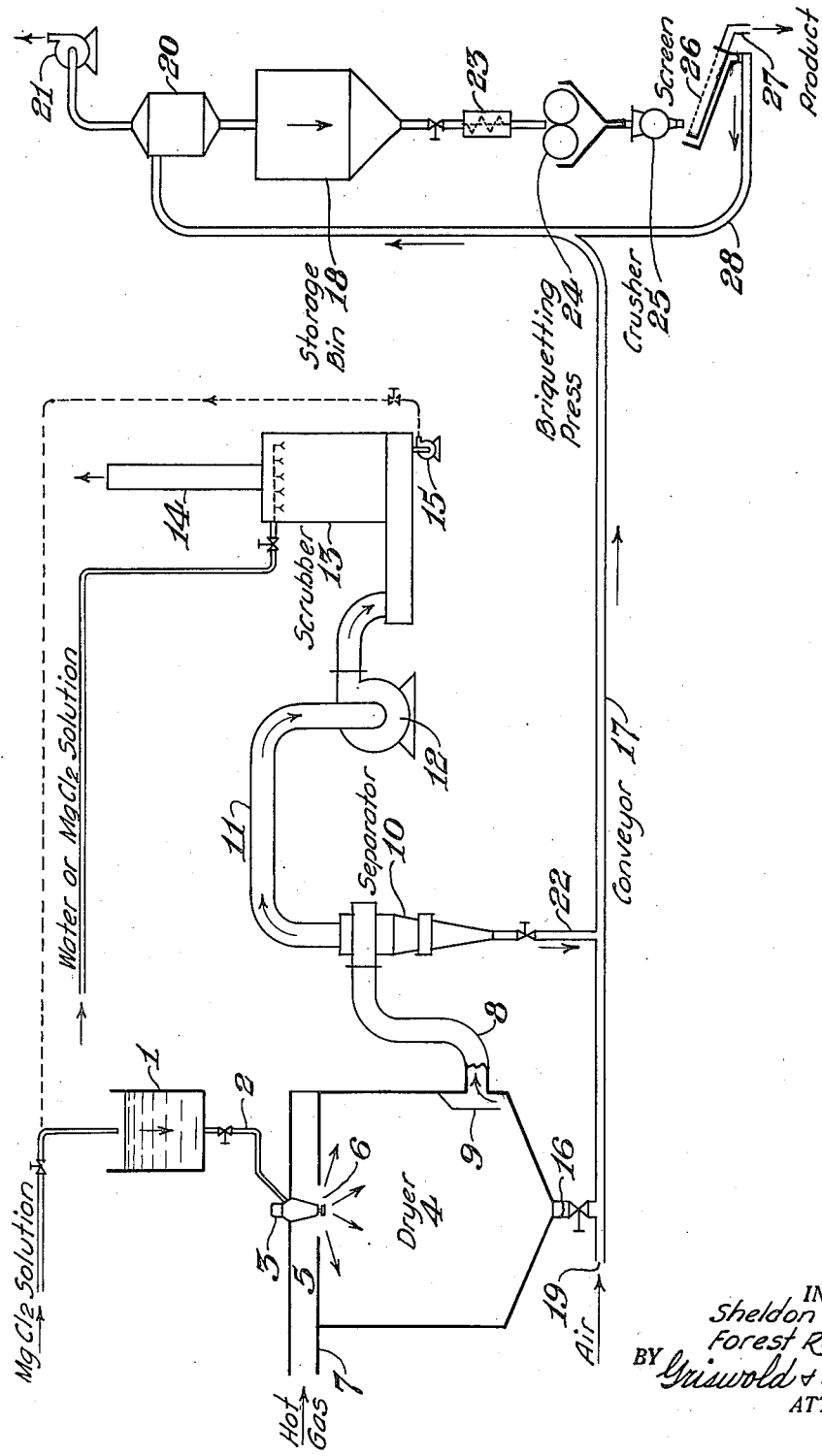

2,277,827

UNITED STATES PATENT OFFICE 2,277,827

PROCESS OF DEHYDRATING MAGNESIUM CHLORIDE

Sheldon B. Heath and Forest R. Minger, Midland, Mich., assignors to The Dow Chemical Company, Midland, Mich., a corporation of Michigan Application May 24, 1939, Serial No. 275,526

4 Claims. (Cl. 23—91)

The invention relates to improvements in processes for dehydrating magnesium chloride, and has particular reference to a process of making a dense granular product which is dehydrated to a water content corresponding to as low as between 1 and 2 moles of water of crystallization, or lower.

The normally hydrated magnesium chloride obtained by usual crystallization methods contains 6 moles of water of crystallization, as represented by the formula $MgCl_2 \cdot 6H_2O$, having a crystal water content of about 53 per cent. The hexahydrate crystals are very hygroscopic, and easily absorb water, so that, if exposed to the air, they soon liquefy and dissolve in the absorbed water. For many purposes a product having a lower crystal water content is desired. In the electrolytic process for making magnesium, in which magnesium chloride is used as raw material, a highly dehydrated chloride is required.

It is well known that numerous difficulties are encountered in dehydrating magnesium chloride, due to the ease with which the hydrated chloride decomposes when heated. Special procedures have been developed for dehydrating it, so as to avoid decomposition as far as possible. A practicable commercial process is described in U. S. Patent No. 1,874,735. According to this process a partially dehydrated magnesium chloride, containing the equivalent of about 4 to 4.5 moles of water of crystallization, is air-dried in continuous manner under controlled temperature conditions to make a product containing between 1 and 2 moles of water of crystallization, which is suitable for use as cell feed in the electrolytic process for making magnesium. The partially dehydrated chloride used as starting material in the aforesaid process is prepared according to the process described in U. S. Patent No. 1,871,428, in which a magnesium chloride solution, or the melted hexahydrate crystals, is concentrated by evaporation to a temperature of about 193° C. and the molten salt then solidified in small particles by flaking or otherwise.

The aforesaid dehydrating processes, however, are subject to certain operating difficulties. In the preliminary concentration by evaporation to a temperature as high as 193° C., high pressure steam is required as the source of heat, the evaporation being carried out in open kettles provided with an acid-proof lining and heated by steam coils. For the coils metals which are resistant to corrosion, such as chrome-nickel steel or the like, must be used. At best, however, there is some corrosion of the steam coils, with resultant contamination of the salt with heavy metal impurities. These impurities are especially undesirable when the dehydrated salt is to be used for electrolyzing to make magnesium, because the impurities in the salt are transferred to the metal produced from it. Heavy metal impurities, such as Cu, Ni, etc., are most objectionable in magnesium, since they greatly increase its susceptibility to corrosion. Another disadvantage in the high temperature concentration of magnesium chloride solutions is the cost of the high pressure steam that must be used. In the air-drying of the partially dehydrated magnesium chloride according to the prior process the mechanical handling of the material in the dryer causes the formation of a considerable proportion of dust, which is unsuitable for use as cell feed in the magnesum cells, and this dust is ordinarily reworked by returning it to the evaporation step where it is redissolved and put through the process again. There is also a certain amount of decomposition of the salt in the air-drying process, so that the product contains an appreciable amount of oxide. It is desirable to reduce such decomposition as much as possible. The fuel requirements of the air-drying process are high, and means permitting a reduction in the fuel consumption are much to be desired.

It is an object of the present invention to avoid the necessity for evaporating concentrated magnesium chloride solutions at high temperatures for which high pressure steam is required, and hence to avoid contamination of the product with heavy metal compounds derived from corrosion of the steam coils. Another object is to effect economies in the fuel consumption in the process. Other objects and advantages will appear as the description proceeds.

Our invention consists in the improved method or process of dehydrating magnesium chloride hereinafter fully described and illustrated in the annexed drawing, in which the single figure is a diagrammatic representation of an apparatus employed in carrying out a preferred embodiment of the invention.

In the improved process according to the invention an aqueous magnesium chloride solution is spray-dried directly to a dehydrated product containing less than 2 moles of water of crystallization by operating under certain definite conditions, as hereinafter explained. A magnesium chloride solution, having a concentration, for example, between about 28 and 42 per cent, is atomized into a drying chamber, wherein the dispersed droplets of solution are intimately contacted with a current of hot gas introduced at a temperature above 350° C., preferably between 400° and about 500° C. The rate of flow of the hot gas current is regulated in relation to the rate of feed of the atomized magnesium chloride solution, so that the temperature of the exit gas from the chamber is not allowed to fall below about 180° C., in order to make a dehydrated product containing from about 1.1 to about 1.8 moles of water of crystallization, which degree of dehydration is suitable for material to be used as cell feed in an electrolytic magnesium process. This method of dehydration has the advantages that decomposition of magnesium chloride to the oxide is materially reduced, heavy metal impurities are avoided, and a substantial saving is effected in fuel cost of the drying.

The spray-dried product made as above is obtained as a fine powder, in which physical form it is not suitable for feeding to an electrolytic cell bath, due to the fact that it is difficult to incorporate in the molten bath and much of it is lost as dust carried away by the gas current from the cell. For this purpose a fairly dense, granular material is desired. We have found, however, that the finely divided spray-dried particles are in the form of hollow spheres, which can be crushed by application of pressure. This fact enables the fine particles to be compressed into blocks or briquets without need for a binder, apparently by reason of the interlocking of the broken spherical particles. Such blocks or briquets are hard, dense and strong, so that they will withstand mechanical handling without dusting or crumbling, and they can be crushed and screened to give a granular material of desired particle size and density for use as cell feed.

In the manner described, therefore, we are enabled to obtain not only a purer dehydrated product at a saving in cost, but also one which is in the form of dense granular particles required for use as raw material for the electrolytic process of making magnesium. We are aware that U. S. Patent No. 1,497,201 describes a spray-drying process for magnesium chloride, in which a magnesium chloride solution is atomized into a hot air current at a temperature of about 300° F. (150° C.) At such drying temperature it is not possible to dehydrate the salt to a water content materially lower than $4H_2O$, and the partially dried particles are not in the form of hollow spheres suitable for compressing into hard briquettes. The product of the prior art process is not capable of being utilized directly as raw material in an electrolytic magnesium process and would require further dehydration by an air-drying process, subject to the disadvantages hereinbefore enumerated, which are overcome by the process of the present invention.

A preferred embodiment of the improved process according to our invention is illustrated in the drawing, to which reference is made. A strong solution of magnesium chloride having a $MgCl_2$ content, for example, of about 28 to 42 per cent, preferably about 38 per cent, is stored in a feed tank 1, where it is advantageously warmed to a temperature of about 120° C. This solution is drawn off continuously through a valve controlled pipe 2 leading to an atomizing device 3, which is preferably of a mechanical type well known in the art, here shown with a high speed rotating bowl suspended from a vertical shaft driven by a direct-connected electric motor, or by other mechanical means. The speed of the rotating bowl may be from 6,000 to 12,000 R. P. M. The atomizing device is suspended centrally in a drying chamber 4, shown with a conical bottom. In upper part of chamber 4 is a gas header 5 communicating with chamber 4 by a central opening 6, through which projects the rotating bowl of the atomizing device 3. The hot gases, for example air or combustion gases, are introduced through inlet 7 into header 5 at a temperature of about 400° to 500° C., and pass thence through opening 6 to come immediately into contact with the fine droplets of salt solution which are discharged radially from the centrifugal bowl of atomizer 3, evaporating water from the droplets by transfer of heat and converting them into sensibly dry hollow spherical particles, which fall to the bottom of the chamber. In the lower part of chamber 4 is a gas outlet duct 8 screened by an apron 9, through which the moisture-laden drying gases from chamber 4 are led to a centrifugal separator 10, where residual suspended solid particles are deposited, and from which the gases are drawn through a duct 11 by a fan 12. The rate of flow of the hot drying gases admitted to chamber 4 is regulated so that the temperature of the exit gases entering duct 8 does not fall materially below 180° C.

The gases from fan 12 are delivered into a scrubber 13 in which they are scrubbed with water or a dilute magnesium chloride solution to cool them and to remove traces of hydrochloric acid before being vented to the atmosphere through stack 14. The use of a dilute magnesium chloride solution as the scrubbing liquid can be availed of, if desired, to effect a concentration of the dilute solution to the point where it is sufficiently concentrated to be employed as feed for the atomizer. Such concentration is produced by means of the residual heat in the exhaust gases, the solution being recycled, if necessary, until sufficient evaporation of water has taken place to raise the concentration to about 28 per cent or more. During such concentration the solution should be kept slightly alkaline by adding magnesium hydroxide or other basic magnesium compound to react with the hydrochloric acid scrubbed from the exhaust gases. When the solution is suitably concentrated it may be forwarded by pump 15 to feed tank 1, as shown by the dotted line.

The finely divided particles of dried material falling to the bottom of chamber 4 are discharged through an outlet 16 into a conveyor 17, by which they are forwarded to a storage bin 18. The conveyor is here shown as of the so-called "airveyor" type, in which the material is conveyed by means of a current of air, although, naturally, other types of conveyors may be used, if desired. Conveyor 17 is comprised of a tubular duct, into which air is admitted through an open inlet 19. The air current in the duct carries the dried salt particles in suspension, at the same time cooling them, to a receiver 20 of enlarged cross-section, in which the particles drop out by gravity, the air current for conveying the particles being drawn through the apparatus by fan 21. The salt particles collected in separator 10 are also delivered through pipe 22 into conveyor 17 and added to the stream of dried material being carried to receiver 20. From receiver 20 the deposited salt particles, now cooled to a temperature of about 40° to 110° C., are delivered by gravity into storage bin 18.

The material in the storage bin normally has a density of about 7 pounds per cubic foot, hence is light and fluffy. This light material, while still warm, is fed into a compacting device 23, in which it is densified by application of moderate pressure applied mechanically, as by a screw, to a density of about 40 pounds per cubic foot, which occurs without substantial consolidation of the particles. The compacted material is then delivered to the rolls of a briquetting press 24, where it is subjected to compression under heavy pressure, on the order of 5,000 to 10,000 pounds per square inch, which consolidates the particles into hard and dense blocks, briquets or pellets having a density of about 80 pounds per cubic foot. The compressed briquets can be crushed into granular particles of smaller size without crumbling or disintegrating. They are delivered from the briquetting press into a crusher 25, which in turn delivers the crushed material to a screen 26, where the fines are screened out through about a 10 to 20 mesh screen, and the oversize lumps above about ⅜ inch size are separated. The screened material is delivered through outlet 27 to containers or a storage bin, the fines are returned through duct 28 to conveyor 17, and the oversize lumps are returned to the crusher. The screened product is of such size and density as is most suitable for use as raw material for electrolytic magnesium cells.

When prepared in the foregoing manner with proper control of temperature within the stated limits, the dehydrated magnesium chloride is obtained with a MgCl₂ content of from 75 to 80 per cent, or more, corresponding to about 1.6, or less, moles of water of crystallization. By this method of drying there is less decomposition of the magnesium chloride than in the customary air-drying method for dehydrating solid salt particles. Comparative analyses of salt dried to the same degree by the two methods are shown in the following table:

| Method | Per- cent $MgCl_2$ | Per- cent MgO |
|---|---|---|
| Air-dried | 76.62 | 4.24 |
| Spray-dried | 76.54 | 2.56 |

By following usual good engineering practice in the conservation of heat, the fuel and power requirement of the improved method of this invention may be as much as 15 to 20 per cent less than that of the prior art method involving the combination of open kettle evaporation of magnesium chloride solution to 193° C., flaking the concentrated salt and air-drying the solid salt particles. The product of the new method is substantially free from heavy metal impurities present in the product of the prior art method. When briquetted, crushed and sized, the hard, dense granular material thereby obtained is more consistently satisfactory in physical form for use as feed for electrolytic magnesium cells than the prior art product, and can be used without material loss from dust or the like, as well as being more satisfactory because of its greater purity.

Other modes of applying the principle of our invention may be employed instead of those explained, change being made as regards the method herein disclosed, provided the step or steps stated by any of the following claims or the equivalent of such stated step or steps be employed.

We therefore particularly point out and distinctly claim as our invention:

1. The method of forming a granular dehydrated magnesium chloride product containing less than 2 moles of water of crystallization which comprises spraying a solution of magnesium chloride into an enclosed space wherein it is intimately contacted with a current of a hot drying gas introduced at a temperature above 350° C., the rate of flow of the solution and of the gas current relative to each other being so regulated that the temperature of the gas current is not reduced below 180° C. within the drying zone, compacting under moderate pressure the finely divided hollow dehydrated particles thereby formed, compressing the compacted mass of particles under high pressure to consolidate the same into dense hard blocks or briquets, and crushing such blocks or briquets to form granular particles of desired size.

2. The method of forming a granular dehydrated magnesium chloride product containing less than 2 moles of water of crystallization which comprises atomizing a concentrated magnesium chloride solution, causing a current of hot drying gas to flow past the point of atomization of the solution into an enlarged closed space wherein the gas and atomized droplets of solution are intimately mixed to dry the latter to the form of finely divided hollow particles, the gas current being introduced at a temperature above 350° C. and withdrawn at a temperature not substantially lower than 180° C., compacting under moderate pressure the mass of finely divided dehydrated particles thereby obtained, compressing the compacted particles under high pressure to consolidate the same into dense hard blocks or briquets, crushing such blocks or briquets, and classifying the crushed material to obtain granular particles of desired size.

3. The method of forming a dehydrated magnesium chloride product containing less than 2 moles of water of crystallization which comprises spraying a solution of magnesium chloride into an enclosed space wherein it is intimately contacted with a current of hot drying gas introduced at a temperature above 350° C., the rate of flow of the solution and of the gas current relative to each other being so regulated that the temperature of the gas current is not reduced below 180° C. within the drying zone, compacting under moderate pressure the finely divided hollow dehydrated particles thereby formed, and compressing the compacted mass of particles under high pressure to consolidate the same into dense hard blocks or briquets.

4. The method of dehydrating magnesium chloride to form a dehydrated product containing less than 2 moles of water of crystallization which comprises intimately atomizing a concentrated magnesium chloride solution, causing a current of hot drying gas to flow past the point of atomization of the solution and into an enlarged closed space, wherein the gas and atomized droplets of solution are intimately intermixed to dry the latter to form particles having the form of hollow spheres, the gas current being introduced at a temperature above 350° C. and being withdrawn at a temperature not materially lower than 180° C., separating the dried salt particles from the gas current, scrubbing the gas current with a dilute magnesium chloride solution which is maintained slightly alkaline by addition of a basic magnesium compound to recover heat from the gas and concentrate the solution by evaporation, and employing such concentrated solution in said first step.

SHELDON B. HEATH.
FOREST R. MINGER.